United States Patent
Guering (10) Patent No.: US 9,643,731 B2
(45) Date of Patent: May 9, 2017

(54) BRACKET FOR DISPLAY DEVICES FOR AN AIRCRAFT COCKPIT

(75) Inventor: Bernard Guering, Montrabe (FR)

(73) Assignee: Airbus Operations (S.A.S.), Toulouse (FR)

( * ) Notice: Subject to any disclaimer, the term of this patent is extended or adjusted under 35 U.S.C. 154(b) by 213 days.

(21) Appl. No.: 13/818,758

(22) PCT Filed: Aug. 24, 2011

(86) PCT No.: PCT/FR2011/051953
§ 371 (c)(1),
(2), (4) Date: Feb. 25, 2013

(87) PCT Pub. No.: WO2012/025695
PCT Pub. Date: Mar. 1, 2012

(65) Prior Publication Data
US 2013/0148325 A1    Jun. 13, 2013

(30) Foreign Application Priority Data
Aug. 24, 2010 (FR) ...................... 10 56729

(51) Int. Cl.
| H05K 7/02 | (2006.01) |
| H05K 7/04 | (2006.01) |
| B64D 43/00 | (2006.01) |
| B60K 37/00 | (2006.01) |
| B60K 35/00 | (2006.01) |
| B60K 37/02 | (2006.01) |
| B60K 37/04 | (2006.01) |

(52) U.S. Cl.
CPC .............. *B64D 43/00* (2013.01); *B60K 35/00* (2013.01); *B60K 37/00* (2013.01); *B60K 37/02* (2013.01); *B60K 37/04* (2013.01); *B60K 2350/106* (2013.01); *B60K 2350/941* (2013.01); *B60K 2350/943* (2013.01)

(58) Field of Classification Search
CPC ................................. B64D 43/00; G01C 23/00
USPC .................................................. 520/255, 260
See application file for complete search history.

(56) References Cited

U.S. PATENT DOCUMENTS

| 3,834,482 A | 9/1974 | Wada et al. |
| 5,196,254 A * | 3/1993 | Akiyama ...................... 428/178 |
| 5,238,387 A | 8/1993 | Hama et al. |
| 5,762,395 A * | 6/1998 | Merrifield .......... B60H 1/00028 |
| | | 180/90 |

(Continued)

FOREIGN PATENT DOCUMENTS

| CN | 1753800 | 3/2006 |
| DE | 3230635 | 2/1984 |

(Continued)

OTHER PUBLICATIONS

International Search Report for PCT/FR2011/051953 mailed Feb. 16, 2012.
English translation of Written Opinion of the International Searching Authority dated Feb. 24, 2013 in PCT/FR2011/051953.

(Continued)

*Primary Examiner* — Hung S Bui
(74) *Attorney, Agent, or Firm* — Nixon & Vanderhye P.C.

(57) ABSTRACT

An instrument panel and glare shield assembly for supporting displays in an aircraft cockpit includes a glare shield formed of a core of cellular structure and two skins covering opposite faces of the core, and the support for the displays is attached to the glare shield.

25 Claims, 3 Drawing Sheets

(56) References Cited

U.S. PATENT DOCUMENTS

| | | | |
|---|---|---|---|
| 5,901,380 A * | 5/1999 | Mishal | A42B 1/067 2/10 |
| 6,464,280 B1 * | 10/2002 | Shibata et al. | 296/70 |
| 2002/0153159 A1 | 10/2002 | Carpenter | |
| 2006/0112409 A1 * | 5/2006 | Yoon | 725/75 |
| 2007/0008188 A1 * | 1/2007 | Firra | 340/973 |
| 2008/0001847 A1 * | 1/2008 | Kratchounova | G01C 23/00 345/1.1 |
| 2009/0053476 A1 * | 2/2009 | Conner et al. | 428/174 |
| 2009/0115729 A1 * | 5/2009 | Groener et al. | 345/167 |
| 2010/0021718 A1 | 1/2010 | Vos et al. | |
| 2012/0075120 A1 * | 3/2012 | Barbieri | B64D 43/00 340/946 |
| 2014/0120773 A1 * | 5/2014 | Crawford et al. | 439/626 |

FOREIGN PATENT DOCUMENTS

| | | |
|---|---|---|
| DE | 199 17 765 | 10/2000 |
| EP | 0 283 926 | 9/1988 |
| EP | 1 213 191 | 6/2002 |
| GB | 821 557 | 10/1959 |
| JP | 11-130924 | 5/1999 |
| JP | 2001-277439 | 10/2001 |
| JP | 2005-186808 | 7/2005 |
| WO | WO 02/081307 | 10/2002 |

OTHER PUBLICATIONS

Chinese Official Action cited in Application No. 201180040606.2 mailed Dec. 3, 2014, with English Translation, 17 pages.

Japanese Office Action mail Jul. 28, 2015 cited in JP 201180040606.2 and English Translation, 19 pages.

* cited by examiner

BRACKET FOR DISPLAY DEVICES FOR AN AIRCRAFT COCKPIT

RELATED APPLICATION

This application is the U.S. national phase of International Application No. PCT/FR2011/051953 filed 24 Aug. 2011 which designated the U.S. and claims priority to FR 1056729 filed 24 Aug. 2010, the entire contents of each of which are hereby incorporated by reference.

BACKGROUND OF THE INVENTION

The invention relates to a support for display devices in the cockpits of aircraft.

Aircraft manufacturers seek to improve the configuration of the front zone of the fuselage, referred to as the "nose section", which contains in particular the cockpit. In this respect, all of the major components of the cockpit are involved and in particular the instrument panel and the glare shield, both of which are situated facing the pilot. The instrument panel carries dials and monitors giving the pilot an instantaneous state of various flight parameters and various other kinds of information. It also carries members enabling the pilot to control various actions.

The instrument panel in a cockpit used to be constituted by a metal sheet having openings in which various dials were received. Those pieces of equipment are connected electrically from behind the panel. Those pieces of equipment also have their own ventilation system.

As airplanes have improved, instrument panels have been provided with control members and in particular actuation levers. However, with increasing density of control members and dials on the instrument panel, it has become increasingly difficult to have access to those pieces of equipment behind the panel, while performing maintenance.

More recently, dials have been progressively replaced by monitors having screens associated with electrical power supply systems and ventilator devices. Nevertheless, those can give rise to major vibration problems.

Finally, the present trend is to place monitors as much as possible so that they run on one from another. When an airplane is not of very large dimensions, this often involves deforming the nose section in order to incorporate a bulky instrument panel.

At present, each support formed by the instrument panel and the glare shield is found to be problematic in numerous aspects. It presents a transverse size that penalizes the aerodynamic shape of the airplane. It is complicated to make and therefore expensive. It is both bulky and heavy. It is sensitive to vibration. Finally, it is difficult to install and to inspect.

SUMMARY OF THE INVENTION

In this respect, an instrument panel is known that is made up of a perforated metal structure that therefore presents openings in which the monitors are received. That perforated structure is not sufficiently rigid. It is made up of various solid portions. It is bulky and forms a complex assembly that is relatively difficult to incorporate within the cockpit. It generates an environment that is particularly dense behind the panel. It often requires a manhole to be provided in order to be able to access the cockpit from the underside of the aircraft and allow all of the portions of the cockpit located behind the instrument panel and the glare shield to be maintained.

An object of the invention is to make supports for display devices in aircraft cockpits easier to fabricate and incorporate.

To this end, the invention provides a support, such as an instrument panel or a glare shield, for supporting display devices in an aircraft cockpit, the support comprising a panel comprising a core of cellular structure and two skins covering opposite faces of the core.

Such a support forms a structure that is particularly light in weight and easy to handle. It can be fabricated by molding and it can easily be given the shape that is desired in order to accommodate the configuration of the nose section, of the cockpit, and of the pieces of equipment that it is to support. Such a support enables a cockpit to be made using a minimum number of parts. In spite of its low weight it presents particularly high stiffness and good ability to withstand vibration, thereby making it entirely suitable for incorporation in the cockpit. An instrument panel or a glare shield of this type becomes self-stabilizing with the help of a few common connections and a few points that are fastened to the structure of the aircraft, in particular to the pylon of the cockpit, if there is one. For given screen area of the monitors, such a support presents a size that is smaller than prior art supports. It makes it possible to achieve a saving in on-board weight. It is simple to make. It makes it easier to install the cockpit and to maintain it. If so desired, such a support makes it possible to avoid providing a manhole. The display devices may be flat screen monitors, dials, etc.

Advantageously, the structure of the core is a honeycomb structure.

Such a structure provides particularly high stiffness for reduced weight.

Preferably, the core is made of aramid, in particular of poly(m-phenyleneisophthalamide).

This material provides good ability to withstand extreme conditions. In particular, it has low combustibility and is self-extinguishing. Its thermal stability makes it a safety material.

Provision may be made for each skin to comprise a composite material.

Preferably, the core presents at least one duct, such as a ventilation duct, extending parallel to the skins and presenting openings opening out from the support.

Such a duct may serve for ventilating one or more pieces of equipment carried by the support. There is therefore no need to provide specific ducts that are independent of the panel. This achieves a saving in weight. In addition, the cockpit as a whole becomes easier to make.

Advantageously, the duct presents at least one orifice opening out in a front face of the support or an end opening out in an edge face thereof.

The invention also provides a combination of a support of the invention and ventilation means connected to the duct in such a manner that the duct forms a ventilation duct.

These means may include incorporated ventilation means for the monitor fastened to the support, and/or may form a part of a ventilation system of the aircraft that is distinct from the support and the monitors. These means may comprise motor-driven means for blowing and/or extracting air.

The invention also provides a support of the invention and at least one monitor including at least one connector for connecting the monitor to calculation means, the monitor preferably being fastened to a face of the support in such a manner that a central zone of the monitor faces the support.

It is conventional for display devices comprising a screen and carried by the instrument panel or the glare shield to be bulky and heavy since, in addition to the display function provided by the monitor and the control function optionally provided by one or more buttons, they incorporate a processor function, i.e. calculation means associated with the display on the screen of the monitor. That is very penalizing for the overall architecture of the support carrying the equipment and for incorporating equipment in the environment of the cockpit. By providing the monitor with the above-mentioned connector, it is possible to separate the monitor from the calculation means and therefore to locate the calculation means remotely from the support. The support therefore need only carry the monitors, thereby making equipment easier to integrate. The monitors are of small thickness and weight and can therefore be carried by supports that are not perforated, which supports present performance that is improved in terms of mechanical and vibration strength. In return, the same supports may be shaped to be more compact and lighter in weight. Furthermore, there results a very significant reduction in the amount of heat that needs to be extracted from the region of the instrument panels, since the monitors deliver much less heat than the calculation means. It is therefore possible to provide ventilation means of smaller capacity.

Preferably, the monitor is hinged to the support.

It is known to provide monitors that are embedded in the instrument panel with one or more handles enabling them to be extracted during a maintenance or replacement operation. By hinging the monitor to the support, it is possible to avoid providing such extractors, thereby leaving more room in the facade for the screens of the monitor themselves and thus reducing constraints in designing the cockpit and in arranging it.

The invention also provides an aircraft cockpit including at least one support of the invention, preferably carrying at least one display device.

Preferably, a rear face of the support carries at least one communications or power supply cable.

The rear face of the panel formed by one of the skins is entirely suitable for receiving one or more cables of this type.

Advantageously, the cockpit includes two supports that are fastened together and that slope relative to each other.

Preferably, one of the supports presents a main face in contact with an edge face of the other support.

There is thus no need to provide a specific part for closing the edge face.

The invention also provides a method of fabricating a support of the invention in which the core is molded with the skins, e.g. by giving the support a general shape that is not plane.

SUMMARY OF DRAWINGS

Other characteristics and advantages of the invention appear further from the following description of an embodiment given by way of non-limiting example and with reference to the accompanying drawings, in which.

DETAILED DESCRIPTON

The figures show a portion of an aircraft cockpit 2 of the invention. In the present example, the aircraft is an aerodyne and specifically an airplane comprising a fuselage, two wings, a tail, and jet engines. It is an airplane suitable for commercial transport of goods and/or of one or more passengers. The airplane is suitable for performing a long-haul light carrying at least 50 passengers, or indeed at least 100 or 200 passengers, or freight. The cockpit 2 is situated at the front of the fuselage and is to be occupied by at least one pilot.

An orthogonal frame of reference X, Y, Z is used below in which the horizontal X and Y directions are respectively parallel with and perpendicular to the longitudinal direction of the fuselage, and the Z direction is vertical.

The cockpit 2 has two supports respectively forming a glare shield 4 and an instrument panel 6, each of which supports pieces of equipment such as monitors 8.

The shield 4 is generally plane but it presents curved zones and edges specifically to give it a shape that is not plane. It comprises a panel made by assembling three layers, namely a core 10 and two skins 12 covering the opposite main faces of the core with the core being sandwiched between them.

The core 10 presents a cellular structure, and specifically a honeycomb structure in this example. It comprises a material such as an aramid that is specifically a meta-aramid, namely poly(m-phenyleneisophthalamide), abbreviated MPD-I. By way of example, is the material sold by the supplier Dupont de Nemours under the name Nomex. The core is generally plane in shape before being molded. In the shield 4 it presents thickness lying in the range 12 millimeters (mm) to 15 mm in the center.

Each of the skins 12 in this example is made of a composite material comprising a matrix of an epoxy resin polymer having fibers embedded therein, specifically carbon fibers. By way of example, it is possible to use fibers having a diameter of 0.15 mm and to place them in a configuration having four iso plies, in which the fibers are distributed in balanced manner in all directions. By way of example, the skin is 0.6 mm thick.

In order to fabricate such a part, the three layers are stacked and the stack is placed in a mold for bonding the layers together and shaping the assembly.

The panel 6 is made in similar manner. As explained below, since it includes a ventilation circuit, its core 10 is of thickness greater than that of the shield 4, and specifically lies in the range 45 mm to 50 mm. This time, skins are used in which the 0.15 mm diameter fibers present five to six plies.

The choice of the above-mentioned materials for the core 10 and for the skins 12 makes it possible to make a shield and a panel that present very good stiffness, good strength, good ability to withstand vibration, and low mass.

In the present example, each face of the support 4, 6 is covered in an outer covering that comprises a very fine glass fabric, commonly referred to as "bridal veil", that is impregnated with phenolic resin. This covering performs several functions: it provides the finish for each face of the panel; it provides electrical insulation insofar as carbon is sufficiently electrically conductive to raise difficulties and in particular to generate latent short circuits; and it provides protection against fire in the zone since phenolic resin does not give off toxic vapor, unlike epoxy resins.

The panel 6 is fabricated in the same manner as the shield 4 and likewise presents a shape that is not plane once it has been completed. In the panel 6 in FIG. 2, there can be seen two flat rectangular portions, respectively a top portion 14 and a bottom portion 16 that are inclined relative to each other, with each of them being inclined relative to the X and Z directions. These portions are parallel to the Y direction. The rectilinear top edge of the bottom portion 16 is connected to the rectilinear bottom edge of the top portion 14, in the center thereof.

The shield 4 and the panel 6 are rigidly fastened to each other and to the main structure of the airplane. The shield is arranged in such a manner that its bottom face formed by the bottom skin extends facing the pilot in the cockpit. The instrument panel 6 is arranged in such a manner that its top or rear face faces the pilot. The shield 4 is located above the panel 6, facing its top face. Its bottom face is pressed against a top edge of the panel 6 so as to close its top edge face.

Unlike the shield 4, in this example the panel 6 presents ducts 20a-20d within its core 10, there being four such ducts that extend parallel to the plane of the core and to the skins 12 within the thickness of the core. Each duct presents one end that opens out from the panel 6 via one of its side faces, to the left for the ducts 20a and 20b and to the right for the ducts 20c and 20d. Each of these ducts also presents one or more orifices passing through the top skin and opening out into the main face of the panel facing the pilots.

The panel 6 in this example carries five flat monitors 8a, 8b, 8c, 8d, and 8e, each having a screen, e.g. a liquid crystal screen. The monitors 8a to 8d are in alignment on the top portion 14 in parallel with one another and they lie in a common plane with their longitudinal edges coinciding.

The monitor 8e occupies the bottom portion 16. The duct 20a presents three orifices opening out through the top skin facing the monitors 8a, 8b, and 8e respectively. The same applies to the duct 20b. In analogous manner, the duct 20c presents three orifices associated with the monitors 8d, 8c, and 8e, as does the duct 20d. In this example, each of the ducts has three successive rectilinear segments that are joined together in pairs by bends. The two orifices associated with each monitor are connected to a ventilation circuit incorporated therein, thereby putting the two ducts into communication with each other via the monitor. These orifices 22 have sealing gaskets. Each of the monitors 8a-8e is provided on its rear face with endpieces forming male orifices 34 that come into correspondence with respective female orifices 22 and penetrate therein when the screen is in its utilization position. The lateral ends of the ducts 20a and 20b are connected to ducts 21, respectively for blowing in and extracting air, these ducts forming part of a motor-driven fan system of the airplane and, for this purpose, the ducts are provided with interfaces for joining to the system. The same applies to the ducts 20c and 20d. A ventilation circuit is thus established for each of the monitors.

The ducts 20a-20d are made while the panel 6 is being molded.

Figures 1, 2, 3, 4:
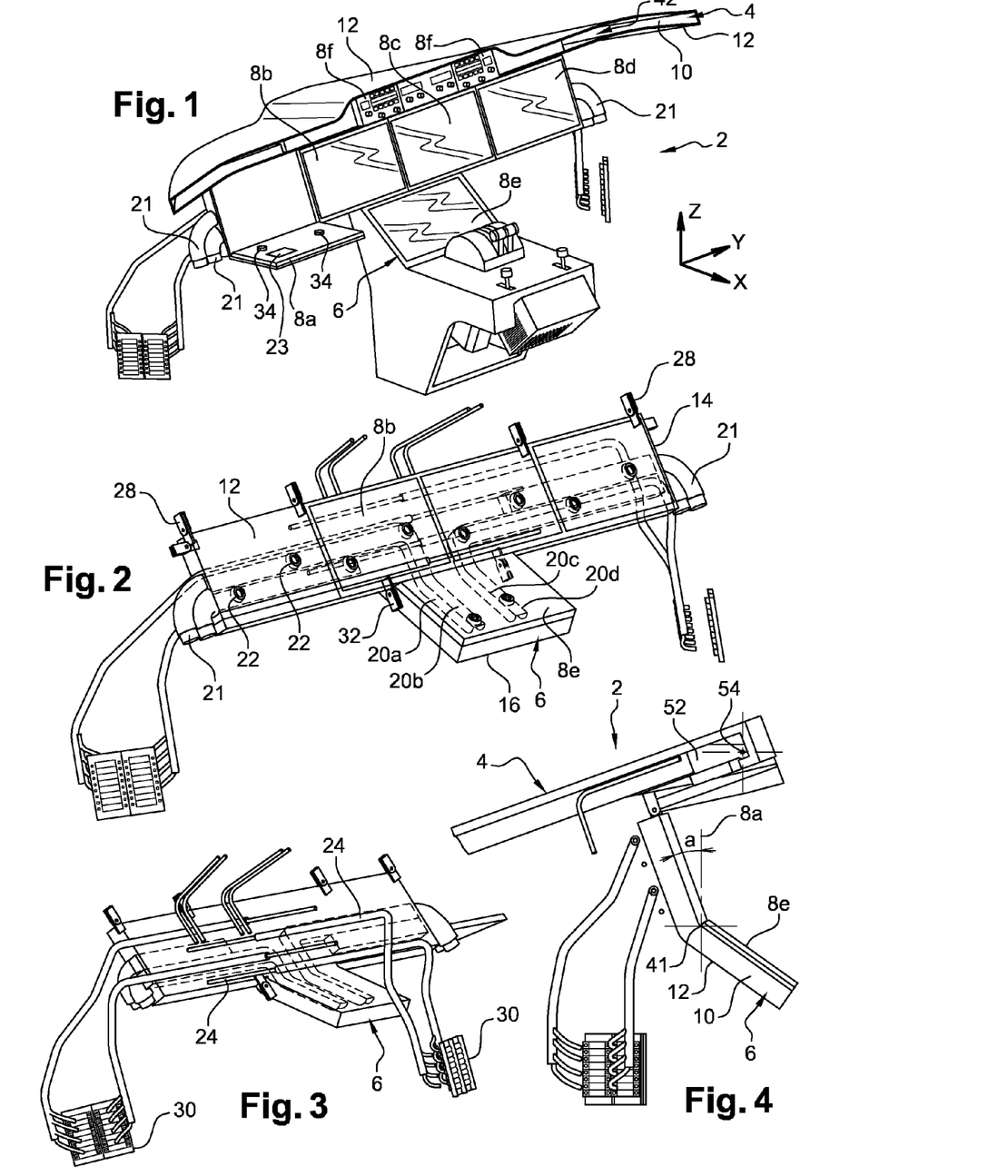
FIG. 1 is a perspective view of a portion of an aircraft cockpit of the invention.
FIGS. 2, 3, and 4 are respectively a front, rear, and side view of the supports for the FIG. 1 cockpit.

Neither the panel 6 nor the shield 4 presents any large through opening that would contribute to weakening it. The rear face of the panel 6 in this example acts as a support for electrical routes. Thus, as shown in FIG. 2, cables 24 are fastened to the rear face of the panel and serve for connecting the monitors 8a-8e to other members of the airplane via the orifices in the panel. Because of the large area available over the rear face of the panel, it is easy to comply with separation distances between the various routes. These cables serve to convey electrical power and electrical or optical signals, respectively. Some of them are also connected to electrical interface plates 30 situated remotely from the shield 4 and the panel 6.

The figures show fastener members 28 for fastening the panel 6 to the structure of the airplane and to the shield 4, respectively. The panel 6 is also fastened by means of members 32 to the pylon of the cockpit.

Figures 5, 6, 7:
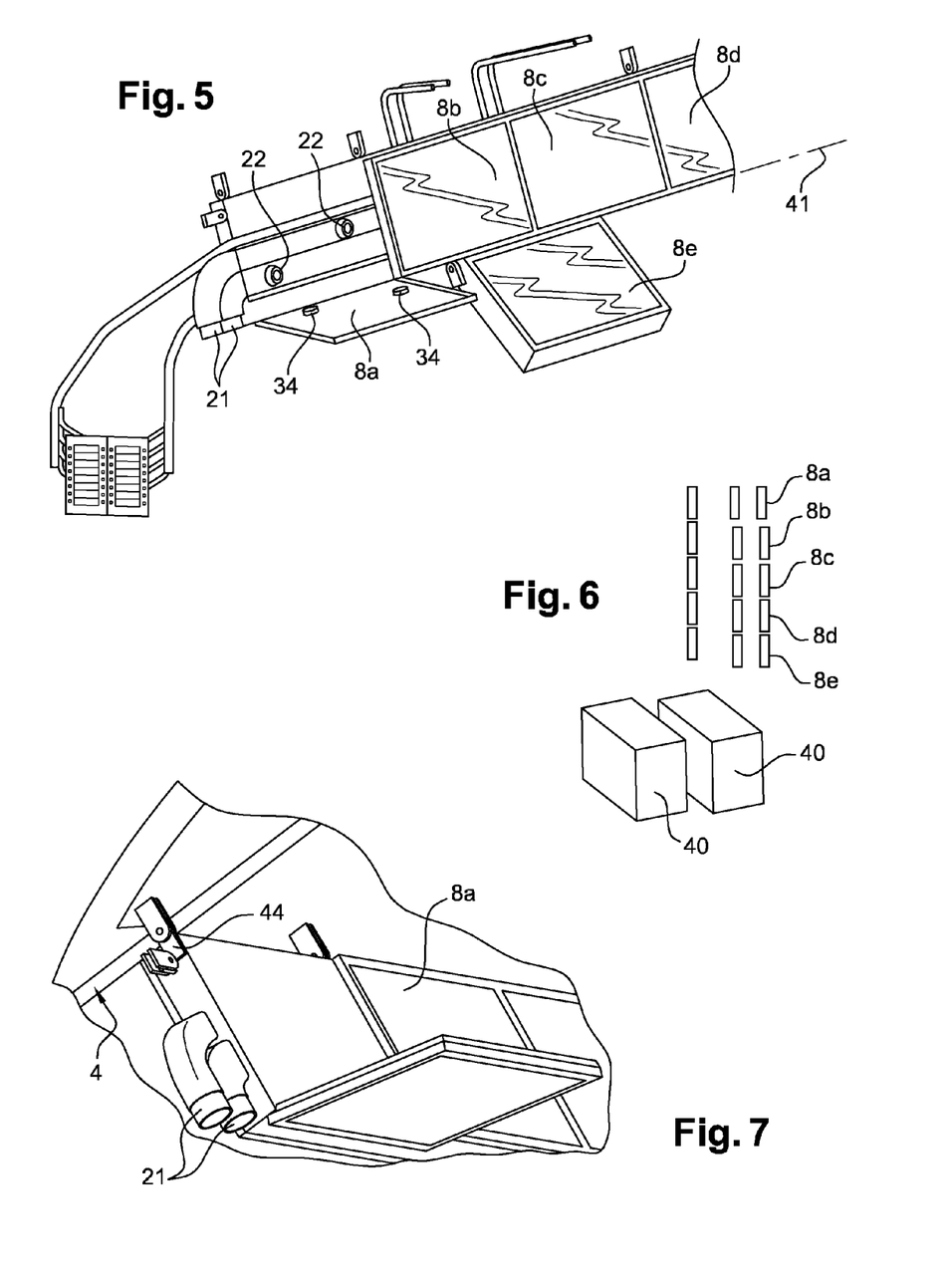
FIG. 5 is a view analogous to FIG. 2 showing how one of the monitors is removed.
FIG. 6 is a diagram showing the arrangement of calculation means for the monitors of the FIG. 1 cockpit.
FIGS. 7 and 8 are perspective views showing the removal of one of the monitors from the FIG. 1 cockpit.

Each of the monitors 8a to 8e is associated with a computer that serves to process data and control the display of data on the screen of the monitor. As shown in FIG. 6, in the present example, these calculation means are specifically separated from the corresponding monitor and remote therefrom. The calculation means for the five monitors 8a-8e are even grouped together so as to constitute only one or two computers 40 as shown in FIG. 6. Each monitor has at least one connector 23 enabling it to be connected by means of a cable to at least one of the computers 40. It is possible to connect each monitor to one or two of the computers depending on the requirements for safety segregation. Although the monitors are carried by the panel 6 or the shield 4, it is advantageous to locate the computers 40 remotely therefrom, e.g. away from the cockpit. The computers can thus be incorporated in a computer rack, e.g. situated in an equipment hold. The same may be done for monitors in the cockpit other than those carried by the shield 4 and the panel 6.

By means of this arrangement, the electrical or optical connections providing communication between the monitor and one or the other of the computers may have a configuration that is relatively simple. The cables providing signal transmission between the monitors and the computers are relatively compact. Provision is also made to power each of them with electricity independently.

The main advantage of this configuration, in addition to simplifying connections, lies in simplifying integration. The monitors are of small thickness and they are light in weight and can therefore be carried by the shield and/or by the panel without them needing to have openings for receiving the monitors. Each monitor thus extends facing the panel or the shield at a respective location that does not have an opening passing through the entire thickness of the support for receiving the monitor. In particular, the central zone of the monitor also extends facing the support. In the absence of such reception housings in the shield and the panel, the shield and the panel present better mechanical and vibration strength and they may be configured in a manner that is more compact and lighter in weight. Furthermore, the monitors themselves generate heating that is only modest so the cooling ducts 20a to 20d may be of small section.

Figure 10:
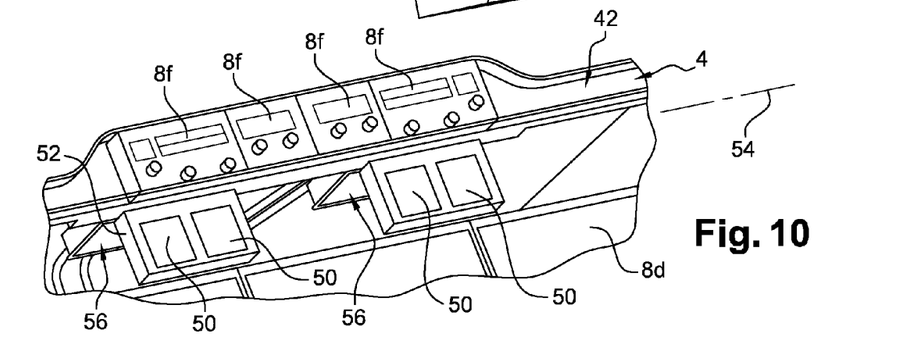

FIGS. 1 and 10 show a facade 42 of the shield 4 that is formed by its rear edge face, and pieces of equipment 8f, there being four of these pieces in this example, that are also in communication with the computers 40.

Furthermore, each of the monitors 8a to 8e is fastened to the panel 6 by being hinged thereto, specifically along a bottom edge of the monitor, about an axis 41 parallel to said edge and to the Y direction. For the four monitors 8a to 8d, this hinge is situated at the bottom edge of the top portion 14. This arrangement is made easier by the calculation portion being located remotely, with the computers 40 situated in an equipment hold, with only the display portion being retained in the cockpit.

Figures 8, 9:
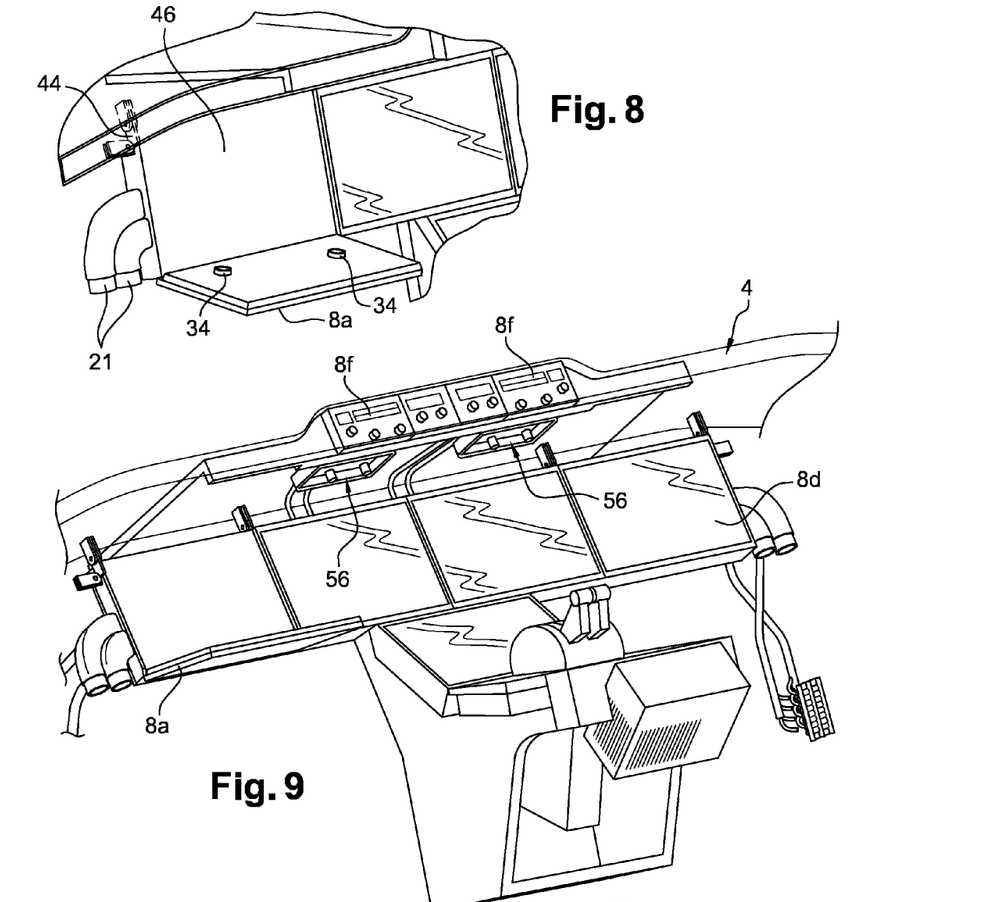
FIGS. 9 and 10 are views analogous to FIG. 1 showing two emergency equipment configurations for the FIG. 1 cockpit.

Each monitor is associated with a member 44 enabling its top edge, remote from the hinge, to be attached to the facing zone of the support, thereby fastening the monitor rigidly to the support. In addition, a safety member such as a flexible tie, e.g. constituted by a cord 46 as shown in FIG. 8, serves to connect the top edge of the monitor permanently to the zone of the support that faces this top edge when the monitor is in its operational position.

A monitor is removed in order to be replaced or maintained as follows:

firstly the member 44 is deactivated in order to detach the support from the top portion of the monitor;

the monitor is then tilted about its axis 41 to move it away from the support, as shown in particular in FIGS. 1, 2, 5, 7, 8, and 9 for the monitor 8*a*. Under all circumstances, because of the length it is given, the cord 46 limits the angle through which the monitor can pivot, for example the cord may have a length that is equivalent to an angle of 130°. This is a safety measure to prevent the monitor from falling;

thereafter, the electrical connectors 23 are separated from the monitor. It should be observed at this point that the tool required for this purpose, such as a screwdriver for loosening the two screws of the connector, may advantageously be stored on the support itself in a cavity specifically for this purpose;

thereafter the monitor is unhinged. This operation is particularly quick if the hinges are made in the form of sliding hinge pins with return springs; and finally, the safety cord 46 is detached in order to enable the monitor to be removed completely.

The monitor is mounted on its support by performing the same operations in reverse order. The monitor is connected to the ventilation circuit as described above automatically once the monitor is put back against the support in its operating position. This connection takes place by two parts sliding one within the other, namely the male part 34 carried by the monitor and the orifice 22 in the support that is provided with a lip seal.

Mounting monitors on the support in this way makes it possible to avoid providing them with extractors at their peripheries, and thus leads to a saving of space. That means that, without modifying the dimensions of the cockpit, it is possible to make provision for increasing the screen area that can be viewed or indeed, while retaining the same screen area, to reduce the width of the shield 4 and of the panel 6 in the transverse direction so as to give the cockpit a configuration that does not penalize the aerodynamic shape of the front of the aircraft.

Provision may be made to enable the monitor to be tilted through an angle a of a few degrees towards the pilot while it is in its operating position in order to space it apart a little from the support, as shown in FIG. 4. Such tilting may be made possible while the member 44 continues to be fastened thereto, or indeed after the member 44 has been disconnected, with the monitor being blocked in position by friction in the hinge. Such a position may be useful in order to limit certain reflections.

Furthermore, it is conventional in a cockpit to provide not only equipment for use during normal stages of flight, but also equipment for use only in emergency stages, e.g. after partial or general failure of various systems. Such emergency equipment thus needs to replace the main equipment when the main equipment is not operational.

Specifically, emergency equipment 50 is carried by the shield 4 and is incorporated in retractable devices 52 such as plates. Specifically, there can be seen two devices 52 each carrying two pieces of equipment 50. Each device 52 is hinged to one of the supports, in this example the shield 4, about an axis 54 that is parallel to the Y direction, and it is movable between a retracted position and an operational position as shown respectively in FIGS. 4 and 9, and in FIG. 10. The shield 4 has two housings 56 that, like the devices 52, are generally in the form of rectangular parallelepipeds, and are suitable for receiving the devices completely when they are in the retracted position. The devices 52 are hinged to the shield about a top edge of each of the devices when in the operating position. In this position, the devices 52 and the pieces of equipment 50 project downwards from the bottom face of the shield so that the pieces of equipment 50 are made visible for the pilot.

The pieces of equipment 50 are designed to be properly visible to the pilot only in emergency mode. In normal mode, they are not visible to the pilots or they are visible to a small extent only. When certain systems of the airplane trigger emergency mode or at any time at the explicit request of the pilots, the pieces of equipment 50 change position so as to appear in the field of view. This command may be electrical and/or manual. Provision may be made for each device 52 to be associated with actuators such as pneumatic mini-actuators that enable the devices 52 to reach stable operating positions while also damping their movements on arrival in such positions.

This configuration thus avoids any need to place emergency equipment in a "preferential" position on the shield 4 or the panel 6. Such a position can therefore be used on a priority basis by the main monitors 8*a* to 8*e*, thereby enabling the width of the shield 4 and of the panel 6 to be reduced while using a solution that is simpler to implement, stronger, and more compact. This arrangement thus makes it possible to release useful space for increasing the area available to the monitors of the main systems, in particular the monitors 8*a* to 8*f*. In particular, it is possible to position the monitors 8*a* to 8*e* and other monitors in continuous manner along the Y direction so as to give the pilot the impression of viewing a single wide screen, and without this requiring the monitors situated at the lateral ends of the top portion of the panel to be tilted towards the pilot relative to the Y direction.

In addition to the above-mentioned advantages, the invention makes it possible to reduce the number of cables that need to be provided in the shield 4 and in the panel 6, given that no calculation functions are performed in those locations. The environment of the pieces of equipment behind these two supports is thus likewise uncluttered and makes it possible to avoid any need to provide a manhole.

Naturally, numerous modifications may be made to the invention without going beyond its ambit.

In particular, independently of the invention which relates to the structure of supports, provision may be made to use:

monitors associated with remote calculation means and possibly means located outside the cockpit;

emergency equipment that is grouped together and retracted so that it only appears under particular circumstances;

no openings for receiving monitors in the supports 4 and 6;

the monitors are hinged to the supports; and there is at least one ventilation duct present that extends parallel to the faces of the support and that presents openings opening out therefrom.

The honeycomb cellular structure could be replaced by a foam.

The invention claimed is:

1. A glare shield and an instrument panel assembly for a cockpit in an aircraft comprising:
   a glare shield positioned in the cockpit and supporting display devices in the cockpit;
   an instrument panel also supporting the display devices in the aircraft cockpit, wherein the glare shield includes an edge extending beyond the instrument panel towards the cockpit along a longitudinal direction of the aircraft, and
   a flat panel of the instrument panel or the glare shield which includes a core of cellular structure and two parallel skins covering opposite faces of the core,
   wherein the core includes at least one ventilation duct extending parallel two the skins and within the core, and the at least one ventilation duct includes openings extending through the one of the skins facing the display devices.

2. The glare shield and instrument panel assembly according to claim 1, wherein the cellular structure of the core is a honeycomb structure.

3. The glare shield and instrument panel assembly to claim 1, wherein at least one of the openings opens to an orifice on a lower surface of the glare shield panel.

4. The glare shield and instrument panel assembly according to claim 1, further comprising one or more connectors configured to couple each of the display devices to a computer system, wherein the computer system is not supported by the glare and shield instrument panel assembly.

5. The glare shield and instrument panel assembly to claim 4, further comprising a hinge for at least one of the display devices, wherein the hinge is attached to the panel.

6. The glare shield and an instrument panel assembly of claim 1 wherein the core is formed of aramid.

7. A glare shield secured to the fuselage and instrument panel assembly for a cockpit in an aircraft, wherein the instrument panel or the glare shield supports display devices of the cockpit, wherein the glare shield supports the instrument panel by fasteners disposed on a bottom surface of the glare shield, and the assembly comprises:
   a flat panel of the instrument panel or the glare shield and the flat panel including a core of cellular structure and parallel skins covering opposite faces of the core,
   a ventilation duct embedded in the core, wherein the ventilation duct is parallel to and between the parallel skins,
   openings in the instrument panel or glare shield, wherein the openings are at ends of the ventilation duct; and
   a ventilation device configured to force ventilation air into the ventilation duct and out the openings, wherein the ventilation device is positioned away from and is not supported by the instrument panel and the glare shield.

8. An aircraft cockpit comprising:
   a glare shield secured to the fuselage, and instrument panel assembly, wherein the instrument panel includes a flat support panel formed of a core of cellular structure and parallel skins covering opposite faces of the core, wherein the glare shield supports the instrument panel,
   a display device in the aircraft cockpit supported by a surface of the support panel, and the display device does not extend through an opening in the glare shield and instrument panel assembly, and
   a ventilation duct in the core of the flat support panel and between the parallel skins, the ventilation duct having openings extending through one of the skins facing the display devices.

9. The aircraft cockpit according to claim 8 wherein a rear face of the support panel carries at least one of a communications cable and a power supply cable.

10. The aircraft cockpit according to claim 8, further comprising a glare shield which overhangs horizontally beyond the support panel.

11. An aircraft cockpit comprising:
    a glare shield and instrument panel assembly including a glare shield and instrument panel, wherein the instrument panel includes a support panel formed of a core of cellular structure and skins covering opposite faces of the core, and the glare shield overhangs horizontally beyond the support panel;
    a display device in the aircraft cockpit supported by a surface of the support panel, and the display device does not extend through an opening in the glare shield and instrument panel assembly,
    wherein a lower surface of the glare shield includes a housing configured to receive an emergency instrument, the emergency instrument is attached by a hinge to the lower surface, and the emergency instrument pivots between a first position seated within the housing and a second position facing the region of the cockpit for the pilot.

12. A glare shield and instrument panel assembly for a cockpit of an aircraft, the assembly comprising:
    a glare shield panel including a core having a cellular structure and skins covering opposite faces of the core, wherein the glare shield panel includes a front edge having a curvilinear shape configured to conform to a cockpit, a rear edge facing a region of the cockpit for a pilot;
    a support panel fastened to a lower surface of the glare shield panel including a first panel section and a second panel section adjacent a lower edge of the first panel, wherein the first and second panel sections are configured to support display monitors;
    the first panel section extends in a direction transverse to a centerline of the cockpit,
    wherein an upper edge region of the first panel section is adjacent the lower surface of the glare shield panel;
    the second panel section is shorter than the first panel section along the direction transverse to the centerline, and the second panel section is attached to a center region of the lower edge of the first panel section, wherein an angle between the second panel section and vertical is greater than an angle between the first panel section and vertical, and
    fasteners connecting the upper edge of the first panel section and the lower surface of the glare shield panel, wherein the fasteners and the glare shield panel provide structural support for the support panel, and wherein the glare shield includes an overhang projecting over at least the first panel section of the support panel.

13. The glare shield and instrument panel assembly of claim 12 wherein the support panel includes a core cellular structure sandwiched between skins.

14. The glare shield and instrument display panel assembly of claim 13 wherein ventilation ducts are included in the core cellular structure of the support panel, and orifices on the support panel are configured to connect the ventilation ducts to cooling passages of the monitors.

15. The glare shield and instrument panel assembly of claim 12 wherein the rear edge includes a facade.

16. The glare shield and instrument panel assembly of claim 12 wherein the glare shield is substantially continuous in a direction transverse to the rear edge.

17. The glare shield and instrument panel assembly of claim 12 wherein the support panel includes a core formed of a cellular material and skins covering the cellular material, and further comprising ventilation ducts extending through the cellular material of the support panel, wherein the ventilation ducts provide cooling passages to orifices on the support panel connectable to cooling passages of the monitors.

18. The glare shield and instrument panel assembly of claim 12 wherein the glare shield panel is continuous between the front edge and the rear edge.

19. The glare shield and instrument panel assembly of claim 12 wherein the overhang extends from the rear edge of the glare shield panel to the fastener members.

20. A glare shield and an instrument panel assembly for a cockpit in an aircraft comprising:
- a glare shield positioned in the cockpit secured to the fuselage; and
- an instrument panel supporting display devices in the aircraft cockpit, wherein the glare shield includes an edge extending beyond the instrument panel towards the cockpit along a longitudinal direction of the aircraft, wherein the glare shield supports the instrument panel by fasteners disposed on a bottom surface of the glare shield, and the instrument panel or the glare shield comprise a core of cellular structure and two skins covering opposite faces of the core.

21. The glare shield and an instrument panel assembly of claim 20 wherein a weight of the instrument panel is carried by the glare shield.

22. The glare shield and an instrument panel assembly of claim 20 wherein the instrument panel hangs below the fasteners.

23. The glare shield and an instrument panel assembly of claim 20 wherein the instrument panel hangs below the glare shield.

24. The glare shield and an instrument panel assembly of claim 20 wherein the fasteners are disposed on a top edge of the instrument panel.

25. The glare shield and an instrument panel assembly of claim 20 wherein the fasteners are at least partially disposed between the instrument panel and the glare shield.

* * * * *